United States Patent
Qian et al.

(10) Patent No.: US 9,321,637 B2
(45) Date of Patent: Apr. 26, 2016

(54) DEVICES FOR ARRANGING CARBON NANOTUBE WIRES

(71) Applicant: Beijing FUNATE Innovation Technology Co., LTD., Beijing (CN)

(72) Inventors: Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 325 days.

(21) Appl. No.: 13/949,196

(22) Filed: Jul. 23, 2013

(65) Prior Publication Data

US 2014/0182120 A1 Jul. 3, 2014

(30) Foreign Application Priority Data

Dec. 27, 2012 (CN) .......................... 2012 1 05771675

(51) Int. Cl.
*B23P 19/00* (2006.01)
*B82Y 40/00* (2011.01)

(52) U.S. Cl.
CPC . *B82Y 40/00* (2013.01); *Y10T 29/53* (2015.01)

(58) Field of Classification Search
CPC .............. B82Y 40/00; Y10T 29/53543; Y10T 29/53539; Y10T 29/53313; Y10T 29/53348; Y10T 29/53357; Y10T 29/534; Y10T 29/53; Y10T 156/1304
USPC ........... 29/771, 779, 781, 783, 791, 822, 823; 156/84, 510, 555
See application file for complete search history.

(56) References Cited

U.S. PATENT DOCUMENTS

| | | | |
|---|---|---|---|
| 5,482,601 A * | 1/1996 | Ohshima et al. .............. 204/173 |
| 6,790,425 B1 * | 9/2004 | Smalley et al. ............. 423/447.1 |
| 2002/0113335 A1 * | 8/2002 | Lobovsky et al. ............. 264/184 |
| 2007/0166223 A1 * | 7/2007 | Jiang et al. ................. 423/447.1 |
| 2008/0170982 A1 * | 7/2008 | Zhang et al. ................ 423/447.3 |
| 2010/0000754 A1 * | 1/2010 | Mann et al. ...................... 174/34 |
| 2011/0155295 A1 * | 6/2011 | Fan et al. ......................... 156/60 |
| 2012/0045645 A1 | 2/2012 | Wei et al. |
| 2012/0231259 A1 * | 9/2012 | Weisenberger et al. ...... 428/323 |
| 2013/0146215 A1 * | 6/2013 | Liu et al. ........................ 156/193 |
| 2013/0248087 A1 * | 9/2013 | Gaillard et al. ............... 156/180 |
| 2014/0072353 A1 * | 3/2014 | Kim et al. ...................... 399/329 |

FOREIGN PATENT DOCUMENTS

CN 102372251 A 3/2012

* cited by examiner

*Primary Examiner* — Moshe Wilensky
*Assistant Examiner* — Darrell C Ford
(74) *Attorney, Agent, or Firm* — Novak Druce Connolly Bove + Quigg LLP

(57) ABSTRACT

A device is provided, including a supplying unit and an arranging unit. The supplying unit includes a guiding axle. A supplying element is located on the guiding axle and a first motor. The supplying element supplies the at least one carbon nanotube wire to the arranging unit, and the first motor drives the supplying element reciprocating straightly along the guiding axle. The arranging unit includes a prism shaped supporter, a whirling arm and a driving mechanism. The prism shaped supporter supports at least one planar substrate, and the driving mechanism drives the whirling arm and the prism shaped supporter rotating round an axis of the prism shaped supporter.

15 Claims, 3 Drawing Sheets

DEVICES FOR ARRANGING CARBON NANOTUBE WIRES

RELATED APPLICATIONS

This application claims all benefits accruing under 36 U.S.C. §119 from China Patent Application No. 201210577167.5, filed on Dec. 27, 2012 in the China Intellectual Property Office, the disclosure of which is incorporated herein by reference.

BACKGROUND

1. Technical Field

The present disclosure relates to a device for arranging carbon nanotube wires.

2. Discussion of Related Art

Microscopic structures of Carbon nanotubes have recently attracted a great deal of attention for use in different applications such as field emitters, gas storage and separation, chemical sensors, and high strength composites, because of their thermal, electrical, and mechanical properties. A carbon nanotube wire including a number of carbon nanotubes is one kind of macroscopic structure of carbon nanotubes.

In some special areas, it is needed to arrange a number of carbon nanotube wires parallel with each other on a surface of a planar substrate. Generally, the carbon nanotube wires are arranged on the surface of the planar substrate by artificial means. However, it is difficult to precisely control a distance between adjacent arranged carbon nanotube wires on the surface of the planar substrate, because of the little diameter of the carbon nanotube wires, for example, about several microns. Furthermore, the artificial means takes time and is hard for use in mass production.

Therefore, a device for arranging carbon nanotube wires is needed, to overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

Figure 1:
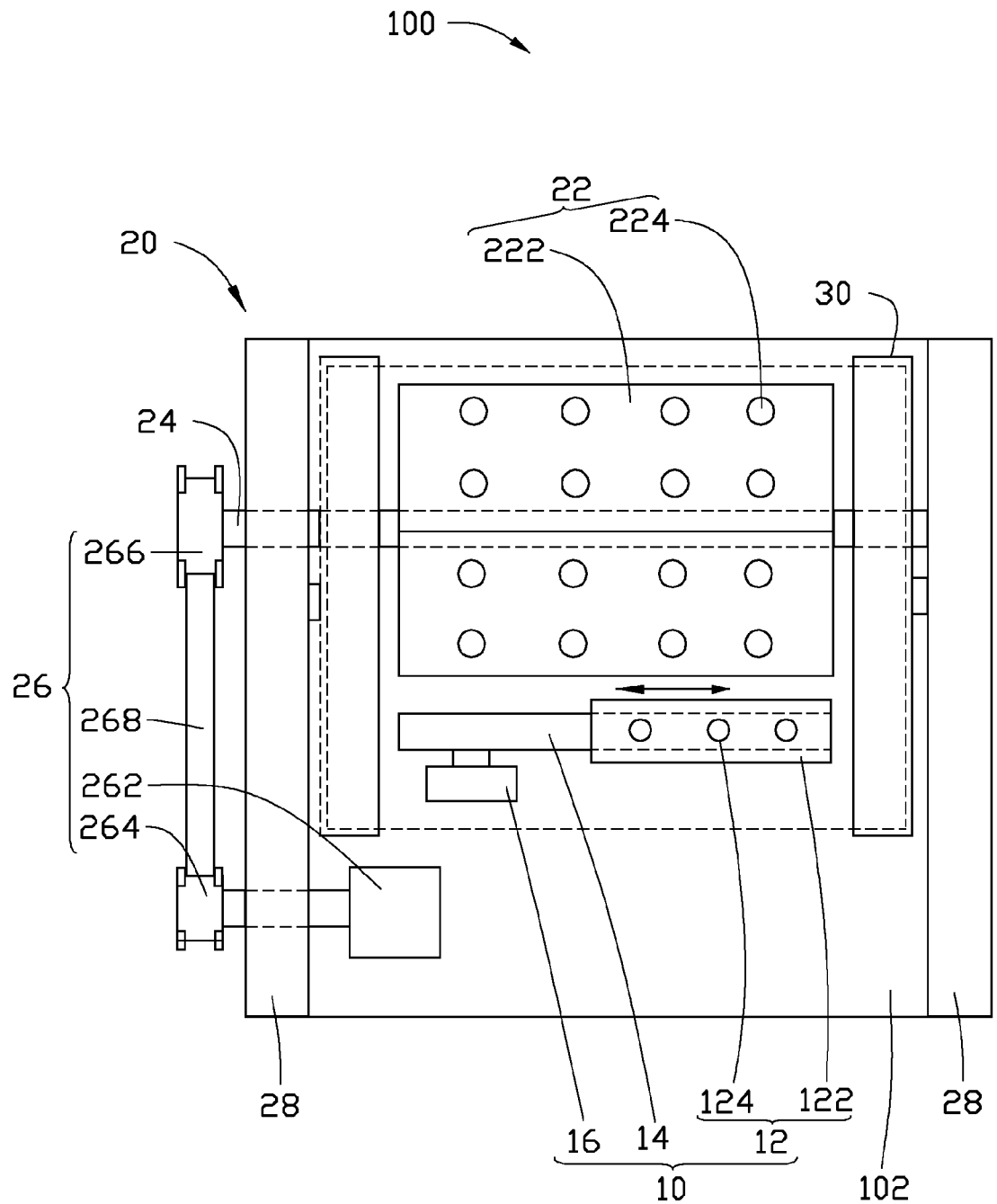
FIG. 1 a vertical view of one embodiment of a device for arranging carbon nanotube wires.
Figure 2:
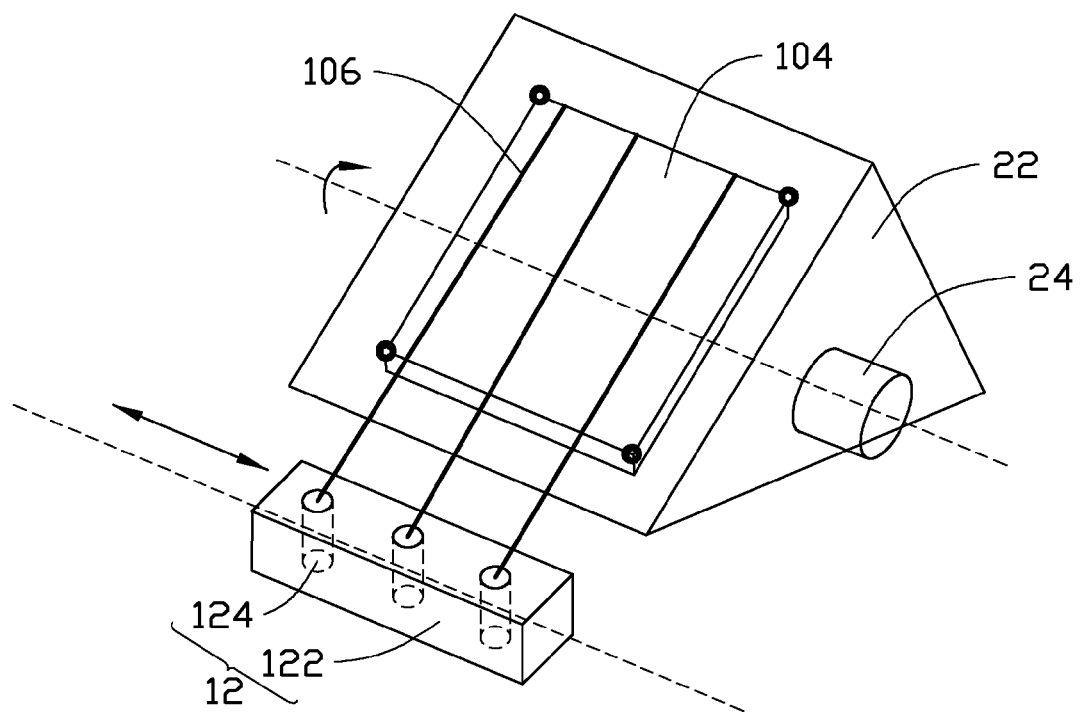
FIG. 2 a schematic view of one embodiment of a supplying unit and an arranging unit of the device in FIG. 1.

Referring to FIGS. 1 and 2, a device 100 for arranging carbon nanotube wires of one embodiment is provided. The device 100 includes a supplying unit 10 and an arrangement unit 20. The supplying unit 10 and the arrangement unit 20 are located on a surface of a base 102 and spaced with each other.

The supplying unit 10 supplies at least one carbon nanotube wire 106 to the arrangement unit 20. The supplying unit 10 includes a supplying element 12, a guiding axle 14 and a first motor 16. The supplying element 12 is located on the guiding axle 14 and capable of reciprocating straightly along an axis of the guiding axle 14. The first motor 16 drives the supplying element 12 reciprocating straightly along the guiding axle 14.

The supplying element 12 includes a body 122 having a first through hole (not shown) and at least one second through hole 124. The supplying element 12 is fixed on the guiding axle 14 by the first through hole. Thus, the supplying element 12 is capable of reciprocating along the axis of the guiding axle 14. One end of the at least one carbon nanotube wire 106 passes through the at least one second through hole 124 and is fixed on the arrangement unit 20. An angle between an axis of the at least one second through hole 124 and the axis of the guiding axle 14 ranged from about 0 degrees to about 90 degrees. In one embodiment, the angle between the axis of the at least one second through hole 124 and the axis of the guiding axle 14 is about 90 degrees. That is, the axis of the at least one second through hole 124 is perpendicular to the axis of the guiding axle 14. Thus, the at least one carbon nanotube wire 106 can pass through the at least one second through hole 124 quickly without damage. In another embodiment, the axis of the at least one second through hole 124 is perpendicular to the axis of the guiding axle 14 and the surface of the base 102.

In some embodiments, the body 122 includes a number of second through holes 124 uniformly located on the body 122 along the axis of the guiding axle 14 and spaced from each other. A diameter of the at least one second through hole 124 ranges from about 1 micron to about 100 microns. In one embodiment, the body 122 includes three second through holes 124 having a diameter of about 10 microns. The supplying element 12 is not restricted by the above description, provided the supplying element 12 can reciprocate straight along a predetermined direction.

In one embodiment, the supplying element 12 further includes at least one carbon nanotube wire reel. The at least one carbon nanotube wire reel supplies the at least one carbon nanotube wire 106 to the body 122.

The arrangement unit 20 supports at least one planar substrate 104 and uniformly arranges the at least one carbon nanotube wire 106 on a surface of the at least one planar substrate 104. The arrangement unit 20 includes a prism shaped supporter 22, a whirling arm 24, a driving mechanism 26 and two parallel supporters 28. The two parallel supporters 28 are located on the surface of the base 102 and spaced with each other. The whirling arm 24 is fixed on an axis of the prism shaped supporter 22. The prism shaped supporter 22 is suspended between the two parallel supporters 28 by the whirling arm 24. The driving mechanism 26 is fixed on one end of the whirling arm 24 and drives the whirling arm 24 and the prism shaped supporter 22 to rotate round the axis of the prism shaped supporter 22.

The prism shaped supporter 22 includes a prism 222 and a number of fixing elements. The prism 222 includes a number of profiles. The fixing elements are located on each profile of the prism 222. In one embodiment, the fixing elements include a number of screw holes 224 located on each profile of the prism 222 and a number of screw nuts. Thus, the at least one planar substrate 104 can be fixed on the profile of the prism 222, by the screw holes 224 and the screw nuts. In other embodiments, the at least one planar substrate 104 is fixed on the profile of the prism 222 by adhesives. In some other embodiments, the at least one planar substrate 104 is fixed on the profile of the prism 222 by other mechanic elements. A cross section of the prism 222 along a direction perpendicular to a length direction of the prism 222 can be triangle, quadrangle, pentagon, hexagon or other geometry shapes. In the embodiment, the cross section of the prism 222 along the direction perpendicular to the length direction of the prism 222 is an equilateral triangle, a square, a rhombic, an equilateral pentagon or an equilateral hexagon. In one embodiment, the prism 222 is a triangular prism, and the cross section of the prism 222, along the direction perpendicular to the length direction of the prism 222, is an equilateral triangle.

The driving mechanism 26 includes a second motor 262, a first belt pulley 264, a second belt pulley 266 and a belt 268. The first belt pulley 264 is mounted on the second motor 262. The second belt pulley 266 is separated from the first belt pulley 264, and mounted on the whirling arm 24. The belt 268 is harnessed to the first belt pulley 264 and the second belt pulley 266. The first belt pulley 264 can be rotated under the second motor 262. The first belt pulley 264 can drive the second belt pulley 266 to rotate by the belt 268. The second belt pulley 266 drives the whirling arm 24 and the prism shaped supporter 22 to rotate. Therefore, a speed of the second motor 262 can control a rotating speed of the whirling arm 24 and the prism shaped supporter 22. The structure of the driving mechanism 26 is not restricted by the above description, provided the driving mechanism 26 can drive the whirling arm 24 to rotate.

Figure 3:
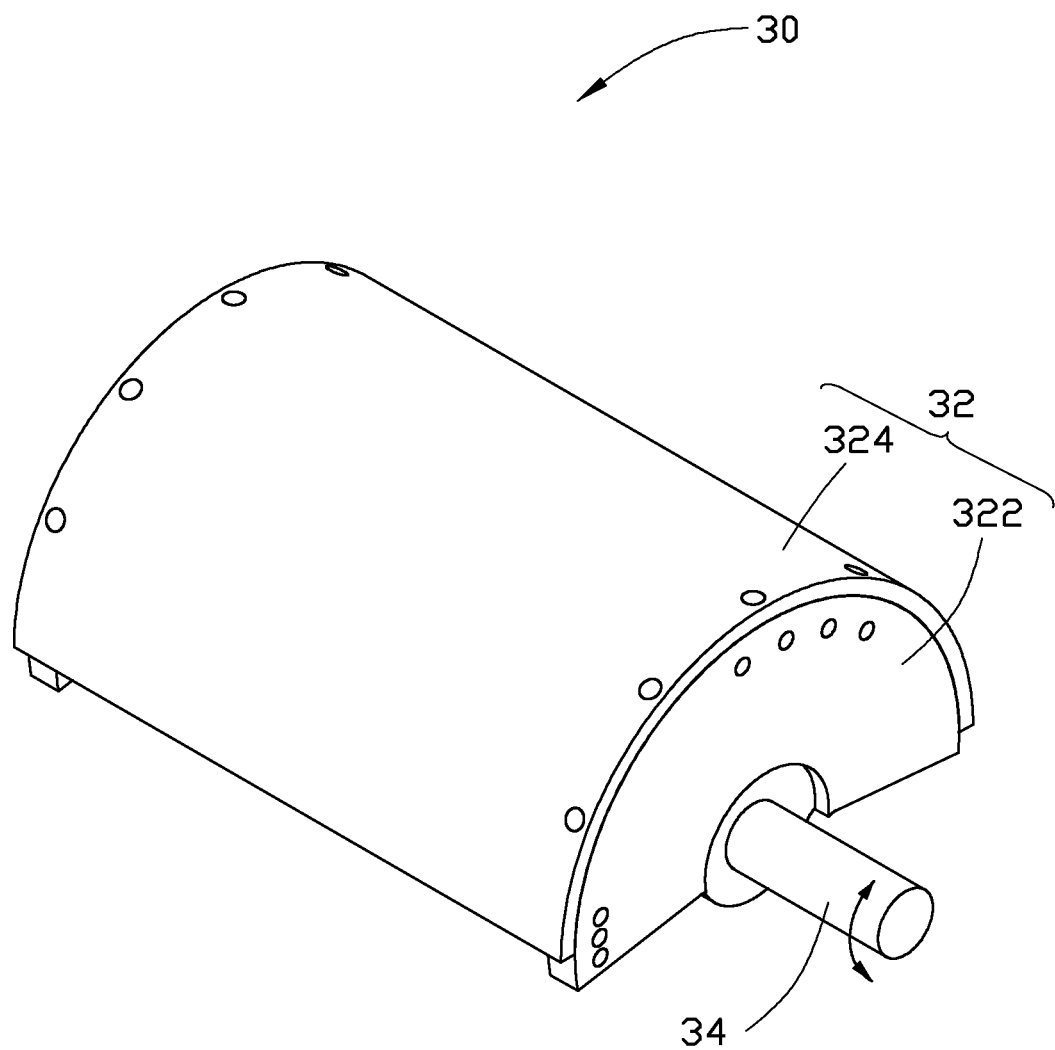
FIG. 3 a schematic view of one embodiment of a protecting cover of the device in FIG. 1.

Referring to FIG. 3, in one embodiment, the device 100 further includes a protecting cover 30. The protecting cover 30 includes a covering body 32 and two coaxial whirling arms 34 fixed on the covering body 32. The covering body 32 includes two sideboards 322 and a cover board 324. The coaxial whirling arms 34 are fixed on the sideboards 322 respectively. The covering body 32 is suspended between the two parallel supporters 28 by the coaxial whirling arms 34. Thus, the sideboards 322, the cover board 324 and base 102 can form a receiving space to receive the prism shaped supporter 22, to prevent the at least one planar substrate 104 fixed on the prism shaped supporter 22 from separating from the prism shaped supporter 22 during the rotation. The covering body 32 rotates around the coaxial whirling arms 34 to open or to shelter the prism shaped supporter 22.

The method for using the device 100 includes the following steps. First, fixing the at least one planar substrate 104 on the profiles of the prism 222. Next, making the at least one carbon nanotube wire 106 pass through the at least one second through hole 124 of the supplying element 12 and fix one end of the at least one carbon nanotube wire 106 on the surface of the at least one planar substrate 104. Then, rotating the prism shaped supporter 22 to drive the supplying element 12 to move straight along the guiding axle 14 at the same time to arranging the at least one carbon nanotube wire 106 on the surface of the at least one planar substrate 104. In addition, cutting the at least one carbon nanotube wire 106 along edges of the at least one planar substrate 104 while arranged on the surface of the at least one planar substrate 104. Thus, a number of the carbon nanotube wires 106 arranged on the surface of the at least one planar substrate 104 can be achieved. In one embodiment, the carbon nanotube wire 106 arranged on the surface of the at least one planar substrate 104 are parallel with each other. A distance between adjacent arranged carbon nanotube wires 106 on the surface of the at least one planar substrate 104 can be controlled by a rotating rate of the prism shaped supporter 22 and a moving rate of the supplying element 12. The greater the rotating rate of the prism shaped supporter 22 and the moving rate of the supplying element 12 are, the smaller the distance between adjacent arranged carbon nanotube wires 106 on the surface of the at least one planar substrate 104 is. In one embodiment, the supplying element 12 are reciprocating along the guiding axle 14, thus, the carbon nanotube wire 106 arranged on the surface of the at least one planar substrate 104 are cross with each other.

In one embodiment, the supplying element 12 is fixed where the prism shaped supporter 22 is capable of moving straight during rotation, thus, arranging the at least one carbon nanotube wire 106 on the surface of the at least one planar substrate 104.

The device 100 of the present embodiment has the following characteristics. First, a number of the planar substrates can be fixed on the prism, thus, a number of the planar substrates with carbon nanotube wire arranged thereon can be obtained at one time. Second, the distance between adjacent arranged carbon nanotube wires on the surface of the planar substrate can be precisely controlled by precisely controlling the rotation rate of the prism shaped supporter and the moving rate of the supplying element. Third, the rotation rate of the prism shaped supporter can be greater than hundreds of revolutions per minute. Thus, an efficiency of the device can be proved.

The above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A device for arranging carbon nanotube wires comprising:
   a supplying unit comprising a guiding axle, a supplying element, and a first motor, wherein the supplying element and the first motor are separately located at two opposite ends of the guiding axle, the supplying element supplies at least one carbon nanotube wire, and the first motor drives the supplying element reciprocating straightly along the guiding axle;
   an arranging unit comprising a prism shaped supporter, a whirling arm, a driving mechanism, and two parallel supporters spaced to each other, wherein the whirling arm is fixed on an axis of the prism shaped supporter, the prism shaped supporter is suspended between the two parallel supporters by the whirling arm, the driving mechanism is located at one end of the whirling arm, and the driving mechanism drives the prism shaped supporter rotating round the axis of the prism shaped supporter;
   at least one planar substrate supported by the prism shaped supporter; and
   a base, wherein the supplying unit and the arrangement unit are located on a surface of a base and spaced with each other, and the guiding axle is parallel to the whirling arm.

2. The device of claim 1, wherein the supplying element comprises a body defining a first through hole, and the supplying element is fixed on the guiding axle by the first through hole.

3. The device of claim 2, wherein the body defines at least one second through hole, and one end of the at least one carbon nanotube wire passes through the at least one second through hole and is fixed on a surface of the at least one planar substrate.

4. The device of claim 3, wherein an angle between an axis of the at least one second through hole and an axis of the guiding axle ranges from about 0 degrees to about 90 degrees.

5. The device of claim 4, wherein the angle between the axis of the at least one second through hole and the axis of the guiding axle is about 90 degrees.

6. The device of claim 4, wherein the body defines a plurality of second through holes, and the plurality of second through holes are uniformly located on the body along the axis of the guiding axle and spaced with each other.

7. The device of claim 4, wherein a diameter of the at least one second through hole ranges from about 1 micron to about 100 microns.

8. The device of claim 3, wherein the supplying element comprises at least one carbon nanotube wire reel adapted to supply the at least one carbon nanotube wire.

9. The device of claim 1, wherein the prism shaped supporter comprises a prism comprising a plurality of profiles and a plurality of fixing elements located on each of the plurality of profiles.

10. The device of claim 9, wherein the plurality of fixing elements comprises a plurality of screw holes located on each of the plurality of profiles and a plurality of screw nuts.

11. The device of claim 10, wherein the at least one planar substrate is fixed on the plurality of profiles by the plurality of profiles and the plurality of screw nuts.

12. The device of claim 9, wherein the at least one planar substrate is fixed on the plurality of profiles by adhesives.

13. The device of claim 9, wherein the prism comprises a cross section along a direction perpendicular to a length direction of the prism is selected from the group consisting of triangle, quadrangle, pentagon and hexagon.

14. The device of claim 13, wherein the cross section is selected from the group consisting of equilateral triangle, square, rhombic, equilateral pentagon and equilateral hexagon.

15. The device of claim 1, further comprising a protecting cover, wherein the base and the protecting cover form a receiving space configured to receive the prism shaped supporter.

* * * * *